C. J. ERICKSON.
CIRCUIT FOR POLE CHANGERS.
APPLICATION FILED JUNE 11, 1917.
1,299,155.
Patented Apr. 1, 1919.
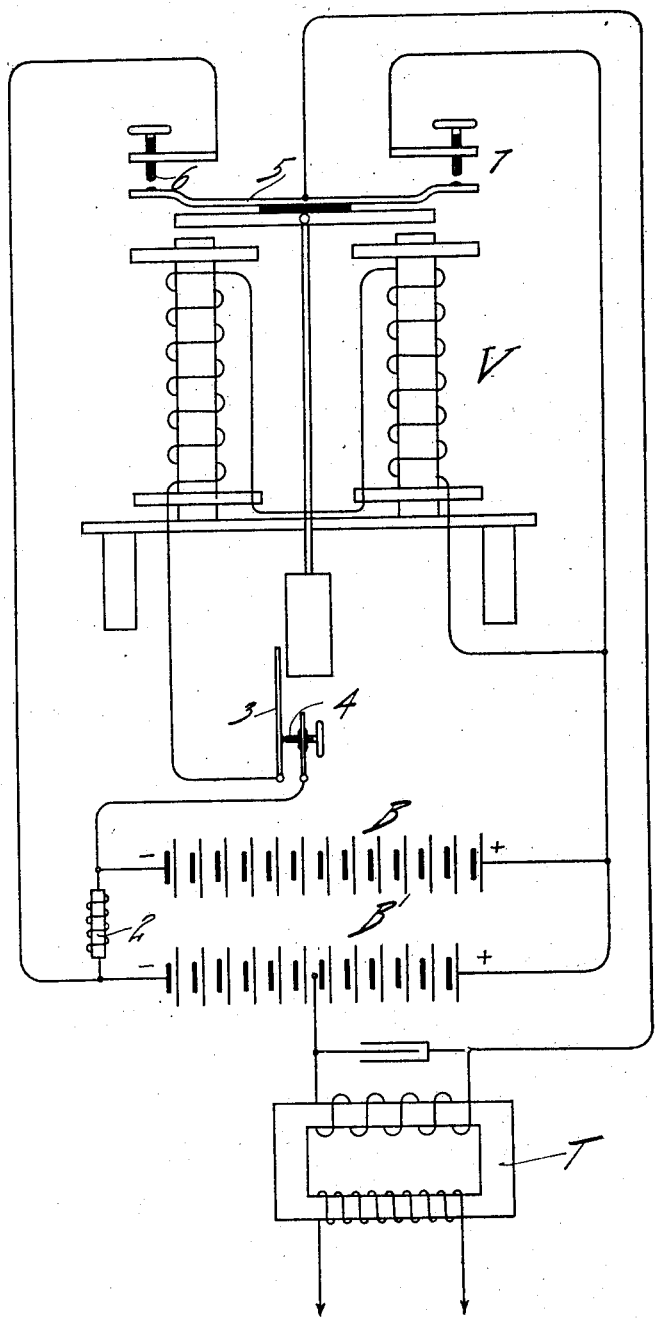
Inventor
Chas. J. Erickson
by [signature]
Attorney

UNITED STATES PATENT OFFICE.

CHARLES J. ERICKSON, OF CHICAGO, ILLINOIS, ASSIGNOR TO AUTOMATIC ELECTRIC COMPANY, OF CHICAGO, ILLINOIS, A CORPORATION OF ILLINOIS.

CIRCUIT FOR POLE-CHANGERS.

1,299,155.        Specification of Letters Patent.      Patented Apr. 1, 1919.

Application filed June 11, 1917. Serial No. 174,021.

*To all whom it may concern:*

Be it known that I, CHARLES J. ERICKSON, a citizen of the United States of America, and a resident of Chicago, county of Cook, and State of Illinois, have invented a certain new and Improved Circuit for Pole-Changers, of which the following is a specification.

My invention relates in general to pole changers and more particularly to the provision of an improved method of connecting up and operating a pole changer in a telephone exchange, for example, where the central battery, from which the pole changer is to be operated, is provided with end cells or counter E. M. F. cells for the purpose of regulating its potential; and the object of the invention is to provide a system of connections such that the end cells may be cut in or out of the exchange battery while at the same time the maximum positive and negative values of the alternating current produced by the pole changer are maintained equal.

In U. S. Letters Patent #1,181,656, granted to me on May 2, 1916, there is shown a pole changer comprising a transformer, a vibrator and a battery. One terminal of the primary winding of the transformer is connected to the middle point of the battery while the other terminal is alternately connected to the positive and negative poles of the battery by the operation of the vibrator. Thus the direction of current flow in the primary winding is rapidly reversed, producing an alternating current in the secondary winding. When a pole changer of this type is used in connection with the common exchange battery, which in the case of automatic telephone exchanges is almost always provided with end cells adapted to be cut in or out of circuit, it has been found that whenever there is an odd number of cells in the battery, the operation of the pole changer is not entirely satisfactory owing to the difference in potential of the two halves of the battery, which produces sparking at the contact points controlling the primary circuit; and owing also to the resulting difference in maximum positive and negative values of the alternating current, which interferes somewhat with the proper ringing of the bells in the exchange.

Of course a separate battery might be provided for operating the pole changer, but this would entail a considerable expense and bother for recharging which it is desirable to avoid. By my invention an arrangement is provided in which the pole changer may be run off the common exchange battery (although a small capacity auxiliary battery is provided) with entirely satisfactory results, all the deleterious effects noted above being avoided.

Referring to the drawing, the reference character B indicates the common exchange battery, while the reference character $B^1$ indicates the auxiliary battery above referred to. This latter battery is preferably of approximately the same potential as the main battery, but must contain an even number of cells. It may, however, be of much smaller capacity; and small storage cells or even dry cells may be used. The reference character T indicates a transformer, while the pole changer, which may be of the type shown in my patent previously mentioned, is indicated by the reference character V.

Proceeding to a consideration of the circuit connections, it will be seen that the battery B' is connected by means of impedance coil 2 in parallel with battery B; in other words, it is connected to "float" across the main bus bars. The vibrator circuit of the pole changer, including the two coils of the electromagnet, the contact spring 3, and the contact point 4, is supplied with current from the battery B in the usual manner. The circuit of the primary winding of the transformer T, however, is supplied with current from the auxiliary battery $B^1$. For this purpose the left hand terminal of the primary winding is connected to the middle point of battery $B^1$, while the right hand terminal is connected to the vibrating spring contact member 5. By the operation of the pole changer the contact member 5 alternately engages contact points 6 and 7, which are connected, respectively, to the negative and positive poles of battery $B^1$. Thus rapid reversals of current are produced in the primary winding, which results in the generation by induction of an alternating current in the secondary winding in the usual manner.

Since the two halves of battery $B^1$ are composed of the same number of cells and therefore have the same potential, it will be seen that the alternating current produced will have uniform positive and negative values, regardless of the number of cells or potential of battery B.

Having described my invention, what I consider to be new and desire to have protected by Letters Patent will be pointed out in the appended claims.

What I claim as my invention is:

1. In a pole changer, the combination with a transformer, of two batteries connected in parallel through an impedance coil, a vibrator and a circuit therefor including one of said batteries, and circuit connections including a lead from either end and also from an intermediate point of said other battery controlled by said vibrator for producing pulsations of current from the other battery in the primary winding of said transformer.

2. In a pole changer, the combination with a transformer, of two batteries, parallel connections between said batteries including an impedance coil, a vibrator and a circuit therefor including one of said batteries, a connection from one terminal of the primary winding of said transformer to the middle point of the other battery, and connections controlled by said vibrator for alternately connecting the positive and negative poles of said other battery to the other terminal of said winding.

3. In a pole changer, the combination with a transformer, of a battery having a fixed and even number of cells, a second battery having a variable number of cells, the said batteries being connected in parallel through an impedance coil, a vibrator and a circuit therefor including the said second battery, a connection from one terminal of the primary winding of said transformer to the middle point of said first battery, and circuit connections controlled by said vibrator for connecting the other terminal of said winding alternately to the positive and negative poles of said first battery.

4. In a pole changer, the combination with a transformer, of a battery having a variable number of cells, a second battery having a fixed and even number of cells equal to or less in number than the minimum number of cells in said first battery, connections whereby said second battery is connected to "float" in parallel with said first battery, a vibrator and an energizing circuit therefor, a connection from one terminal of the primary winding of said transformer to the middle point of said second battery, and circuit connections controlled by said vibrator for alternately connecting the positive and negative poles of said second battery to the other terminal of said winding.

Signed by me at Chicago, Cook county, State of Illinois, this 6th day of June, 1917.

CHARLES J. ERICKSON.

Copies of this patent may be obtained for five cents each, by addressing the "Commissioner of Patents, Washington, D. C."